(12) United States Patent
Hasegawa

(10) Patent No.: US 6,390,251 B1
(45) Date of Patent: May 21, 2002

(54) BACK PLATE ATTACHED TO THE DISK BRAKE PAD, AND METHOD OF MANUFACTURING THE SAME

(76) Inventor: Tsutomu Hasegawa, 5-253, Nishitakao, Saitama-ken, Kitamoto-shi (JP), 364-0035

(*) Notice: Subject to any disclaimer, the term of this patent is extended or adjusted under 35 U.S.C. 154(b) by 0 days.

(21) Appl. No.: 09/933,015

(22) Filed: Aug. 21, 2001

(30) Foreign Application Priority Data

Aug. 23, 2000 (JP) ........................................ 2000-252789

(51) Int. Cl.⁷ .......................... F16D 69/00; F16D 65/092
(52) U.S. Cl. ............... 188/251 M; 188/258; 188/250 G
(58) Field of Search ........................ 188/250 R, 250 B, 188/250 G, 250 D, 251 A, 251 M, 258, 73.31, 73.36, 73.37

(56) References Cited

U.S. PATENT DOCUMENTS 5,509,508 A * 4/1996 Evans ..................... 188/73.38
6,269,669 B1 * 8/2001 Matsubara et al. ............. 72/53

FOREIGN PATENT DOCUMENTS

| JP | H04-224324 | 8/1992 |
| JP | 8-159188 | * 6/1996 |
| JP | H11-063042 | 3/1999 |

* cited by examiner

*Primary Examiner*—Christopher P. Schwartz
(74) *Attorney, Agent, or Firm*—Nixon & Vanderhye P.C.

(57) ABSTRACT

A back metal plate comprising a plurality of substantially spheric surfaced dimples each having a portion adjoined to a portion of another dimple, the dimples being formed at least on either a front or a back surface of the back metal plate, flat portions having the upper end surface surrounded by the dimples constituting the same plain as the plate surface, and boundary portions which are lower than the flat portion and higher than the bottom portion of the dimples formed to the adjoined portion of the dimples, and a method of manufacturing the back metal plate includes forming the dimples by cold-working the plate material through coining.

6 Claims, 10 Drawing Sheets

BACK PLATE ATTACHED TO THE DISK BRAKE PAD, AND METHOD OF MANUFACTURING THE SAME

FIELD OF THE INVENTION

The present invention relates to a back metal equipped to a disk brake mounted on a vehicle or an industrial machine etc., that supports a friction member used in a brake pad with variable pressure from the surface of the friction member that is not in contact with a rotor, and the method of manufacturing the same.

Figure 13:
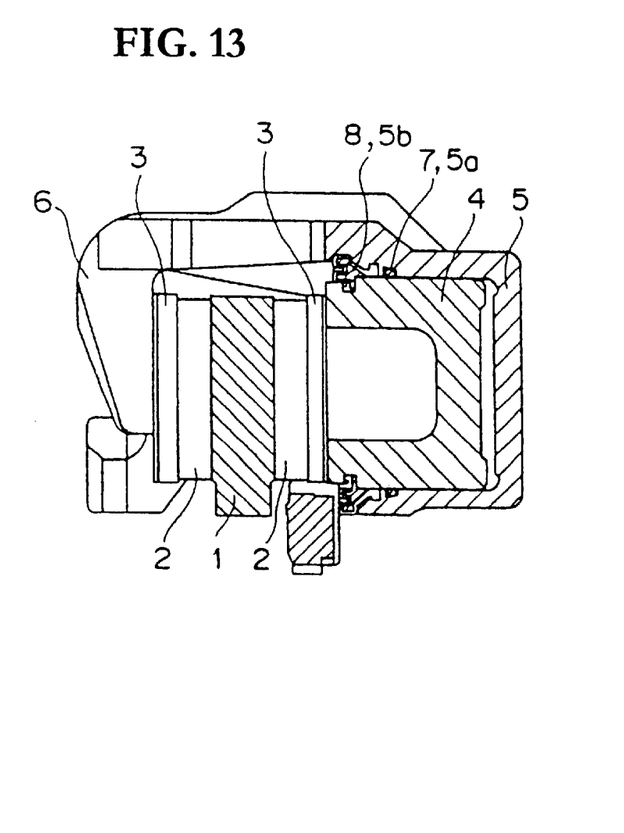
FIG. 13 is an explanatory partial cross-sectional view showing the disk brake according to the prior art.

Heretofore, in the case of a single cylinder type disk brake, the disk brake comprises as shown in FIG. 13 a disk rotor (hereinafter called rotor) 1, friction members 2, 2 that sandwich the periphery of the rotor and constitutes a brake pad, and back metal plates 3, 3 that are adhered to the side of each friction member that is not in contact with the rotor. Further, the end surface of a brake piston (hereinafter called piston) 4 contacts one of the two back metal plates 3 on the opposite surface to where the friction member contacts, and a cylinder 5 housing the piston 4 is connected to a caliper 6, the upper end of the caliper 6 placed so as to bridge over the outer peripheral of the rotor 1. The back surface of the other back metal plate is adhered and fixed to the surface of the caliper 6 facing the rotor.

The inner surface of the cylinder 5 is carved so as to create a seal groove 5a for fitting a seal ring 7 for preventing the pressure oil from leaking and a seal groove 5b for fitting a dust boot 8 acting as dustproof seal to be placed between the piston and the cylinder.

Figure 14A:
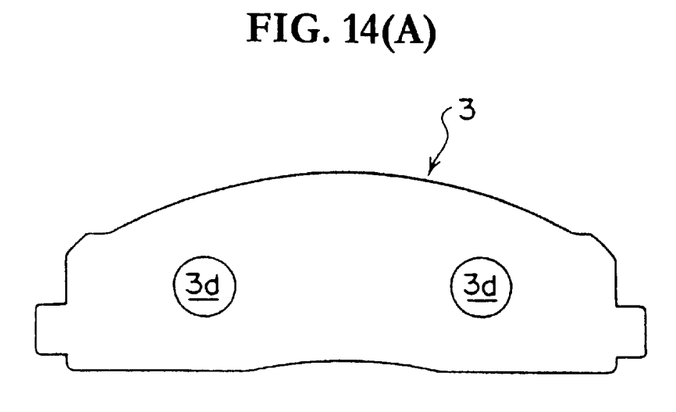
Figure 14B:
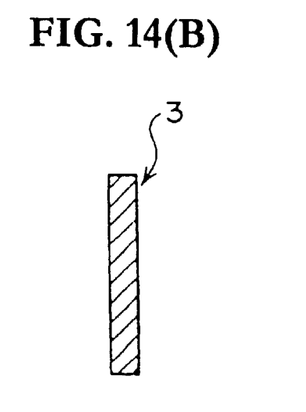

The back metal plate 3 can be formed by perforating a steel plate with a press so as to create a predetermined back metal plate shape having flat front and back surfaces with holes (perforations) 3d, 3d formed thereto as shown in FIG. 14, or having either concavity and covexity or dimples formed to the surface that contacts the friction member 2.

[Problems]

Since the conventional back metal plate 3 for a disk brake is required to have enough strength to endure pressure, a flat-shaped steel plate is normally used.

The deformation of the back metal plate 3 causes dragging, brake noise, deterioration of the feeling of the brake and so on. In order to prevent deterioration of the back metal plate 3 by changing the material being used, the cost for material of the back metal plate becomes too expensive.

On the other hand, since the pressure surface of the back metal plate 3 comes into contact with the piston 4, the heat generated at the friction portion is transmitted from the back surface via the piston 4 to the brake fluid, thereby raising the temperature of the brake fluid, and in some cases even causing vapor lock. Therefore, when the disk brake is to be used for special purposes, means for preventing the excessive temperature rise of the brake fluid must be applied to the disk brake, such as inserting a heat insulator between the piston 4 and the back metal 3.

SUMMARY OF THE INVENTION

The present invention aims at providing a solution for the problems of the prior art product. The object of the present invention is to provide a back metal plate of a disk brake pad and the method of manufacturing the same, the back metal plate having an improved bend strength without having to rely on any special material, having advantageous heat radiation property without adding any insert, thereby enabling to suppress excessive temperature rise of the brake fluid.

In order to solve the problems of the prior art effectively, the present invention provides in claim 1 a back metal plate of a disk brake pad comprising a plurality of dimples each having a substantially spherical surface with a portion being overlapped to one portion of another dimple, said dimples formed to at least either a front surface or a back surface of a plate member; flat portions surrounded by said dimples, the upper surfaces of which constituting the same surface as said plate surface; and boundary portions formed to the areas where said dimples overlap, which are lower than said flat portions but higher than the bottom portion of said dimples.

According to this invention, boundary portions each having a substantially square-shaped flat surface surrounds each dimple, thereby increasing the bend strength of the back metal plate, and realizing a relatively lightweight back metal plate. The dimples are formed to the whole surface of the back metal plate creating a wavelike cross-section, and the remaining flat portion where no dimples are formed becomes the contact surface with the piston, the contact area between the piston and the surface of the back metal plate being reduced with gaps formed thereto, enabling air to flow through the boundary portion between the dimples and helping heat radiation, thus reducing the heat being conducted to the piston and preventing excessive temperature rise of the brake fluid.

Further, the present invention provides in claim 2 a back metal of a disk brake pad in which the depth of the dimples is in the range of 0.3 to 1.5 mm. This improves the reinforcing effect of the back metal plate.

The back metal plate of a disk brake pad according to claim 3 characterizes in that the dimples are formed to both front and back surfaces of the back metal plate, the dimples on one side being positioned so as to oppose to the dimples on the other side. This feature enables the reinforcement effect of the back metal plate to be realized effectively by the boundary portions being protruded at the same positions on the front and back surfaces of the back metal plate.

Moreover, the back metal plate of a disk brake pad according to claim 4 of the present invention is characterized in that the dimples are formed to both front and back surfaces of the back metal plate, the pitch of the dimples formed on one side being displaced from the pitch of the dimples on the other side. This feature of the invention provides a back metal plate having a substantially even thickness with increased strength.

The method for manufacturing the back metal plate of a disk brake pad comprises forming the dimples mentioned in any one of claims 1 through 4 by cold-working a plate material using coining. Providing dimples to a plate surface by cold-pressing hardens the plate material and the boundary portions formed between adjacent dimples act as reinforcement members improving the bend strength of the back metal plate. Thus, the bend strength of the back metal plate is increased without increasing the plate thickness of the back metal plate. The process to create dimples to the whole surface of the back metal plate forms flat portions surrounded by the dimples and boundary portions formed to the area where the dimples overlap, by which the cross-sectional shape of the back metal plate becomes wavelike. This wavelike cross-section of the back metal plate prevents the whole contact surface of the back metal plate from coming into contact with the piston, limiting the area of contact to the boundary portions surrounding the dimples and the flat portions, the concaved portions of the boundary portions creating gaps to the contact area, through which air is flown, helping heat radiation. This gap further suppresses the amount of friction heat generated at the time of braking from being conducted to the piston through the back metal plate, and thereby prevents the brake fluid from being heated excessively.

Moreover, the method for manufacturing the back metal plate of a disk brake pad according to claim 6 is characterized in that the dimples according to any one of claims 1 through 4 are formed by a rolling process. According to this method, the metallographic of the plate material being pressed by the rollers is plasticized, and a back metal plate having predetermined sized dimples is created.

BRIEF DESCRIPTION OF THE DRAWINGS

FIG. 1 is an explanatory view showing the back metal plate of a disk brake pad according to an embodiment of the present invention, wherein (A) is an external view showing the front surface shape, (B) is an A—A arrow view of (A), and (C) is a B—B arrow view of (A);

FIG. 2 is an enlarged explanatory view showing the back metal of a disk brake pad according to FIG. 1, wherein (A) is an explanatory plan view showing the steps for forming the dimples arranged linearly, (B) is an explanatory plan view showing the steps for forming dimples arranged in multiple rows, (C) is an explanatory cross-sectional view showing the metallographic arrangement of the back metal plate before forming the dimples, (D) is an explanatory enlarged cross-sectional view showing the shape of the formed dimples, and (E) is an explanatory cross-sectional view showing the metallographic arrangement after forming the dimples;

FIG. 4 is an explanatory cross-sectional view showing the state after forming the dimples to the back metal plate of the disk brake pad mentioned above, wherein (A) is an explanatory cross-sectional view showing the state where the dimples on the two surfaces are opposed, and (B) is an explanatory cross-sectional view showing the state where the pitch of the dimples formed on one surface is displaced from the pitch of the dimples on the other side;

FIG. 14 is an explanatory external view showing the back metal plate of the disk brake pad according to the prior art, wherein (A) is a front view, and (B) is a cross-sectional side view.

DETAILED DESCRIPTION OF PREFERRED EMBODIMENT

The preferred embodiment of the present invention explained in the following refers to the case where the dimples are formed on both sides of the back metal plate, each dimple being positioned to oppose to the dimple on the other side. However, the members constituting the back metal plate of the present embodiment that are equivalent to those explained in the prior art description are provided with the same reference numbers, and the explanations thereof are omitted.

Further, the detailed description of the embodiment is aimed to help understand the present invention better, and it is not meant to limit the range of the present invention unless it is clearly stated so.

[Construction]

Figure 1A:
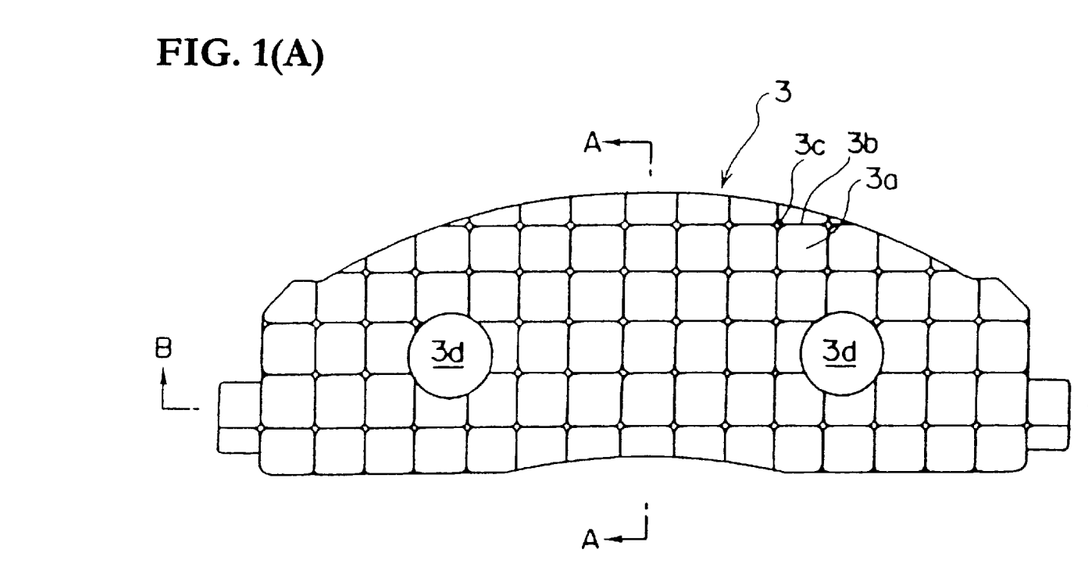
Figure 1B:
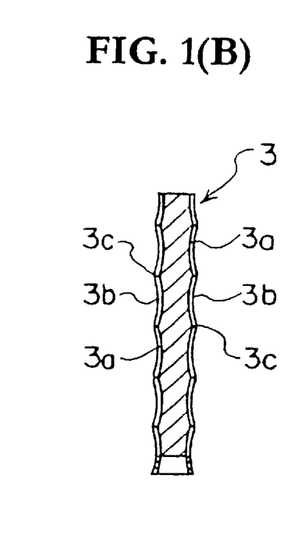
Figure 1C:
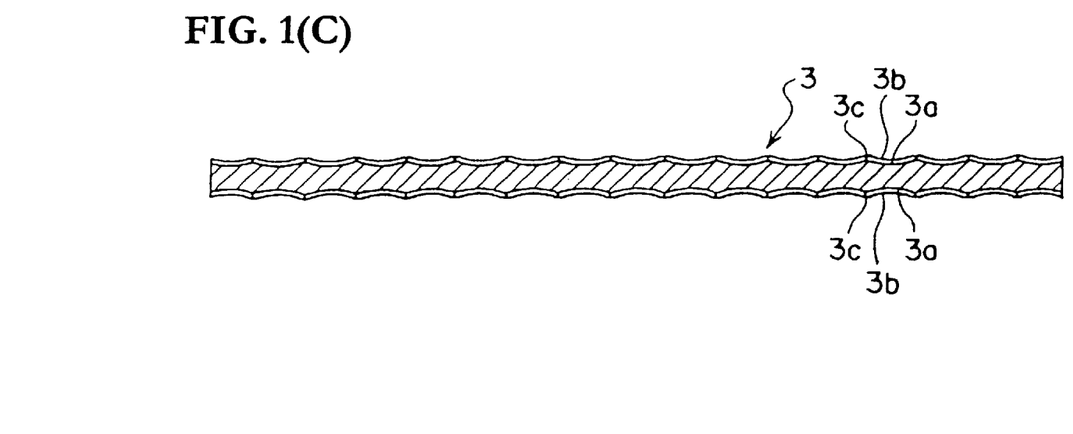

The back metal plate of a disk brake pad according to the present embodiment includes, as shown in FIG. 1, dimples 3a concaved to form spherical surfaces on the front and back surfaces of the back metal plate 3. The dimples 3a are arranged so that the center portion of the dimples are positioned at roughly equal intervals and in multiple rows and columns, and at the same time, the overlapped portions of the neighboring dimples where a portion of the two spherical surfaces are superposed create a curved border upper end being convexed inwardly.

Figure 2A:
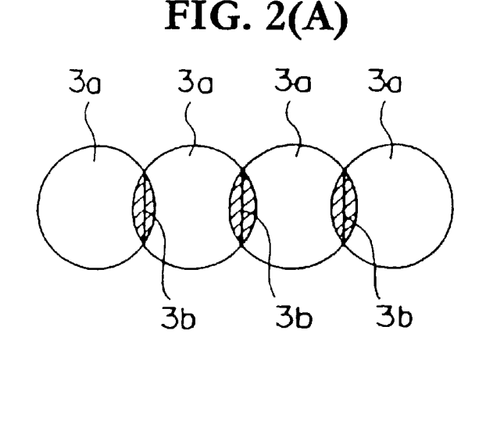
Figure 2B:
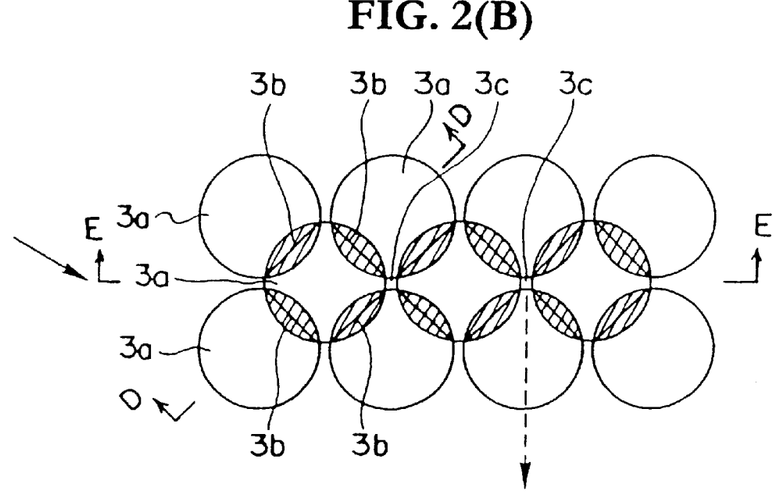
Figure 2C:
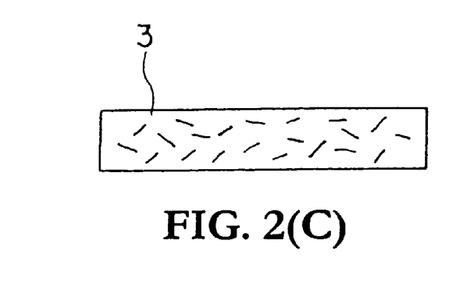
Figures 2D, 2E:
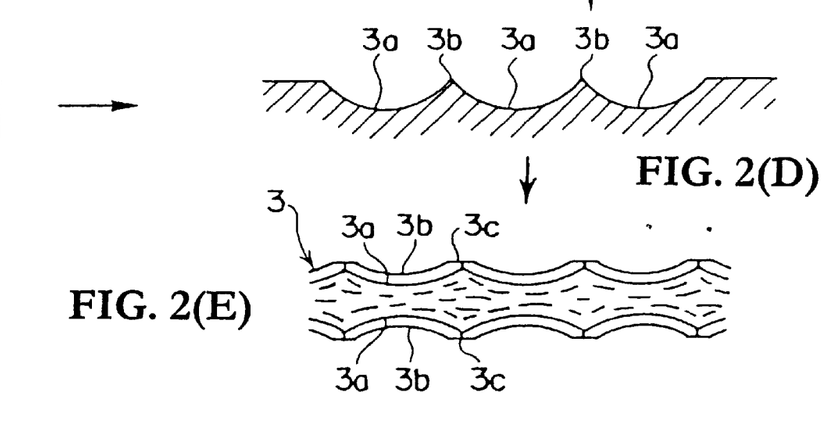
Figure 3:
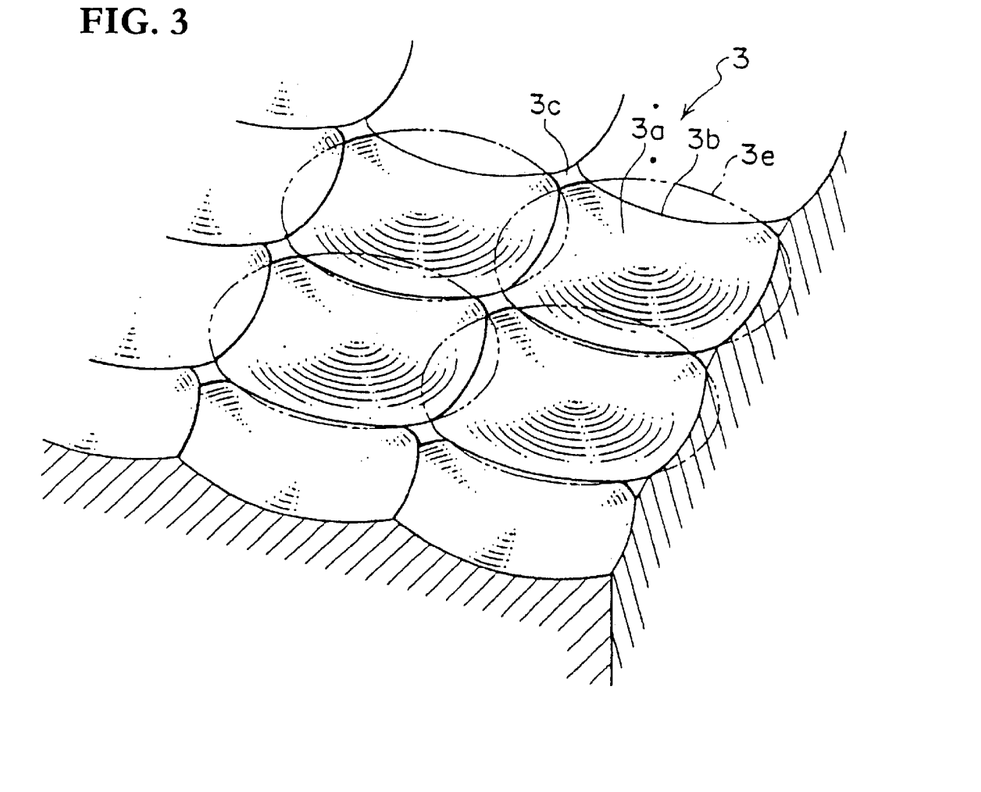
FIG. 3 is an explanatory perspective cross-sectional view showing the state of the dimples formed on the back metal plate of the disk brake pad mentioned above.

As shown in FIGS. 2 and 3, at the periphery of each dimple is formed a plurality of border portions 3b created by the neighboring dimples crossing over each other, the cross-sectional shape thereof being a curved line (arc line) that is concaved toward the inside and the plan shape thereof being a linear shape, and a remainder portion (hereinafter called flat portion) 3c that is surrounded by four dimples 3a corresponding to the four corners of the border portion 3b surrounding the periphery of each dimple 3a and having a flat upper surface that constitutes the same surface as the plate surface.

Each border portion 3b formed around the dimple 3a is created so that the upper end portion having a flat surface is formed to have a roughly square shape excluding the four corners, the squares forming a lattice pattern. At the four corners of each border portion 3b that connect the border portions is formed a flat surface, the upper surface of which constituting the same surface as the plate surface, and having a cross-sectional surface shape curving inward and spreading as it extends downward, having shaped roughly as a trapezoid.

As mentioned, by surrounding each dimple 3a with the border portion 3b and the flat portion 3c shared with adjoining dimples 3a, the plurality of flat portions 3c, . . . , 3c and the plurality of border portions 3b, . . . , 3b define the border between one dimple 3a and all the dimples 3a, . . . , 3a that are adjacent thereto.

Figure 4A:
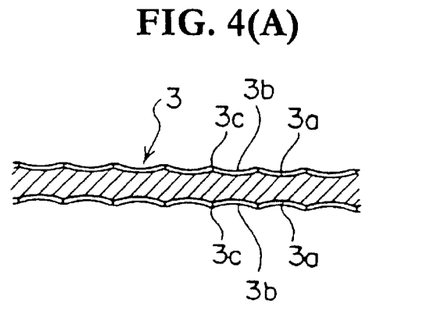

As shown in FIG. 4(A), when the dimples 3a on the front surface of the back metal plate are positioned to oppose to those on the back surface thereof, the border portions 3b are formed to protrude at the same positions on the front and back surfaces thereof.

Moreover, as shown in FIG. 1, perforations 3d that penetrate the front and back surfaces of the back metal plate 3 are formed to predetermined areas thereof.

The greatest depth of each dimple 3a should be set in the range of 0.3–1.5 mm. If the depth of the dimples is set to 0.2 mm or shallower, the dimples do not realize a reinforcement effect, and when the depth exceeds 1.5 mm, it causes processing distortion of the back metal plate that exceeds the range enabling straightening of the metal.

For example, when forming 7 rows and 17 columns of dimples 3a on the back metal plate 3 having a length of 58 mm, a width of 119 mm, and a thickness of 5 mm, the size of each dimple 3a is set so that (refer to FIG. 3) the diameter of circle 3e is 8 mm, the depth at the deepest point of the spherical surface is approximately 0.5 mm, the size of each side of the roughly square-shaped area formed by the border portion 3b is approximately 7 mm, and the area of the peak of the flat portion 3c being formed to the four corners of the border portion 3b has a subtense of approximately 1 mm.

Figure 5:
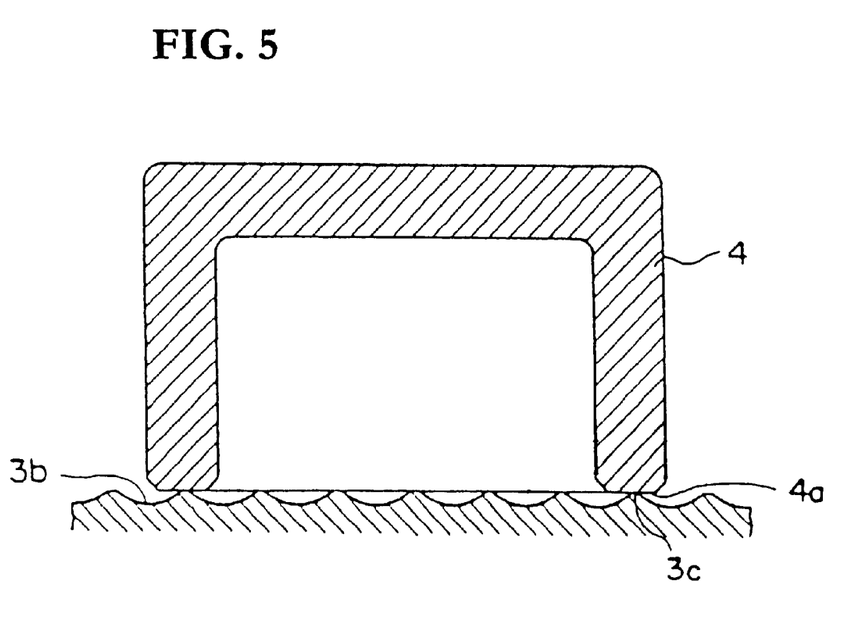
FIG. 5 is an explanatory view showing the concept of the state of contact of the back metal plate surface and the piston according to the back metal plate of the disk brake pad mentioned above.

By forming dimples 3a on the plate material used as the back metal plate 3, the direction of the particles in the metal material which were optional when no dimples were formed as shown in FIG. 2(C) are aligned in the longitudinal direction as shown in FIG. 2(E), since the direction of the particles are crushed in the direction of height when the dimples are formed. This contributes to increasing the mechanical strength of the back metal plate together with the hardening process by the dimple forming process. Since the strength of the back metal 3 is increased, the thickness of the back metal plate 3 can be reduced while maintaining the same mechanical strength, thereby contributing to reducing the weight of the back metal plate. Since the border portion 3b of each dimple 3a is created as a protrusion, the surface of the back metal plate has continuous concavity and convexity, the protruded portion forming the border portion 3b acting as reinforcing member against bending load, increasing the strength of the back metal plate. Moreover, as shown in FIG. 5, the concave of the border portion 3b creates a gap between the back metal plate and the pressing member 4a of the piston 4, thereby limiting the contact area to the flat portion 3c, which not only reduces the amount of friction heat generated when breaking is performed and transmitted to the piston 4 through the back metal plate 3, but also enables easy heat radiation. Accordingly, the excessive temperature rise of the brake fluid is suppressed.

[Manufacturing Method]

Coining is applied to form the back metal 3.

A steel material, an aluminum alloy or the like is used as the material for forming the back metal plate 3, out of which the steel material is most preferable since it is inexpensive and has high strength.

Figure 6A:
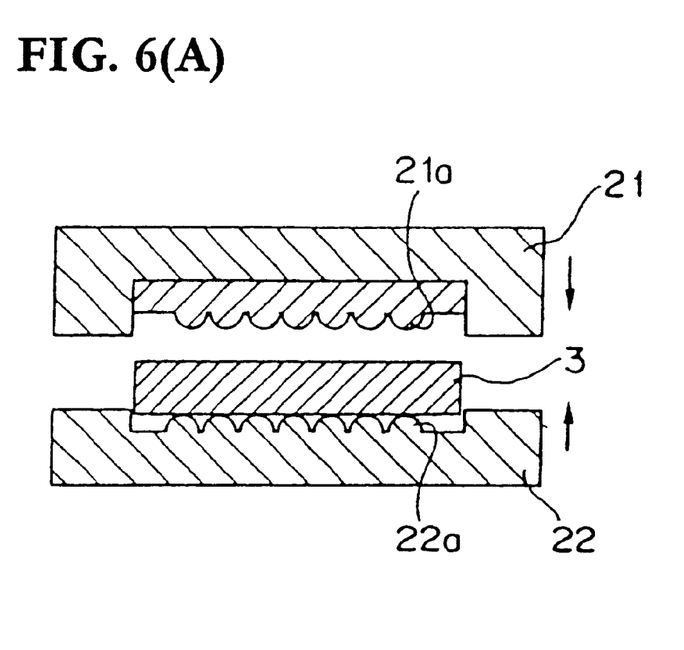
FIG. 6 is an explanatory view showing the concept of the coining process for the back metal plate of the disk brake pad mentioned above.
Figure 6B:
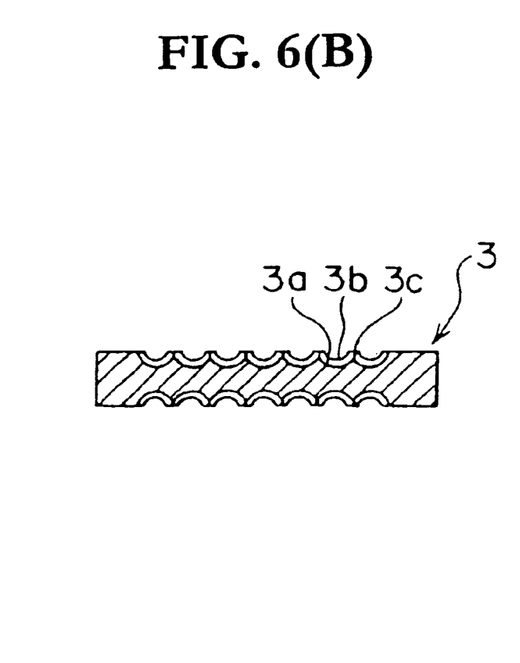

In order to form the back metal plate 3 using coining, as shown in FIG. 6, a metal mold for coining is formed by creating an upper mold 21 and a lower mold 22 having protruded portions 21a and 22a that are convexed so as to correspond to the concaved dimples 3a. Then, a back metal plate 3 having no dimples formed thereto is set between the upper mold 21 and the lower mold 22, and the upper mold 32 is pressed toward the lower mold 22, performing a cold-working die pressing, by which dimples 3a are formed to the portions where protrusions 21a and 22a are pressed, and a back metal plate 3 having predetermined dimples 3a is thereby manufactured.

The protrusions 21a and the protrusions 22a that form the dimples 3a each has a spherical surface having a convexed cross-sectional shape protruding outward, and each spherical surface is formed adjacent another spherical surface so that a portion of the adjoining spherical surfaces are crushed by each other. The border between the adjoining spherical surfaces has a linear plan shape. Moreover, at each portion of the metal molds corresponding to the four corners of the border is formed a hole having a depth so as not to contact the plate surface during the pressing step when forming the dimples 3a, thereby enabling to form a remaining portion whose four sides are surrounded by dimples 3a.

The area where the adjoining spherical surfaces of the protrusions 21a or 22a are crushed is characterized by the following. When four overlapped portions are formed at even intervals on the circumference of the circle on a plate surface formed by the spherical surface of the four protrusions 21a or 22a surrounding one circle formed on the plate surface, the area of the overlapped portion is equal to or below 20% of the whole area ratio on the flat surface.

[Effect]

According to the preferred embodiment mentioned above, when forming the dimples 3a by cold-working the back metal plate 3, the back metal plate is plasticized during the process but the deformation of the metal is restricted by the metal mold, and the metal material having no where to go is compressed and hardened, so the strength of the metal is improved.

Figure 7:
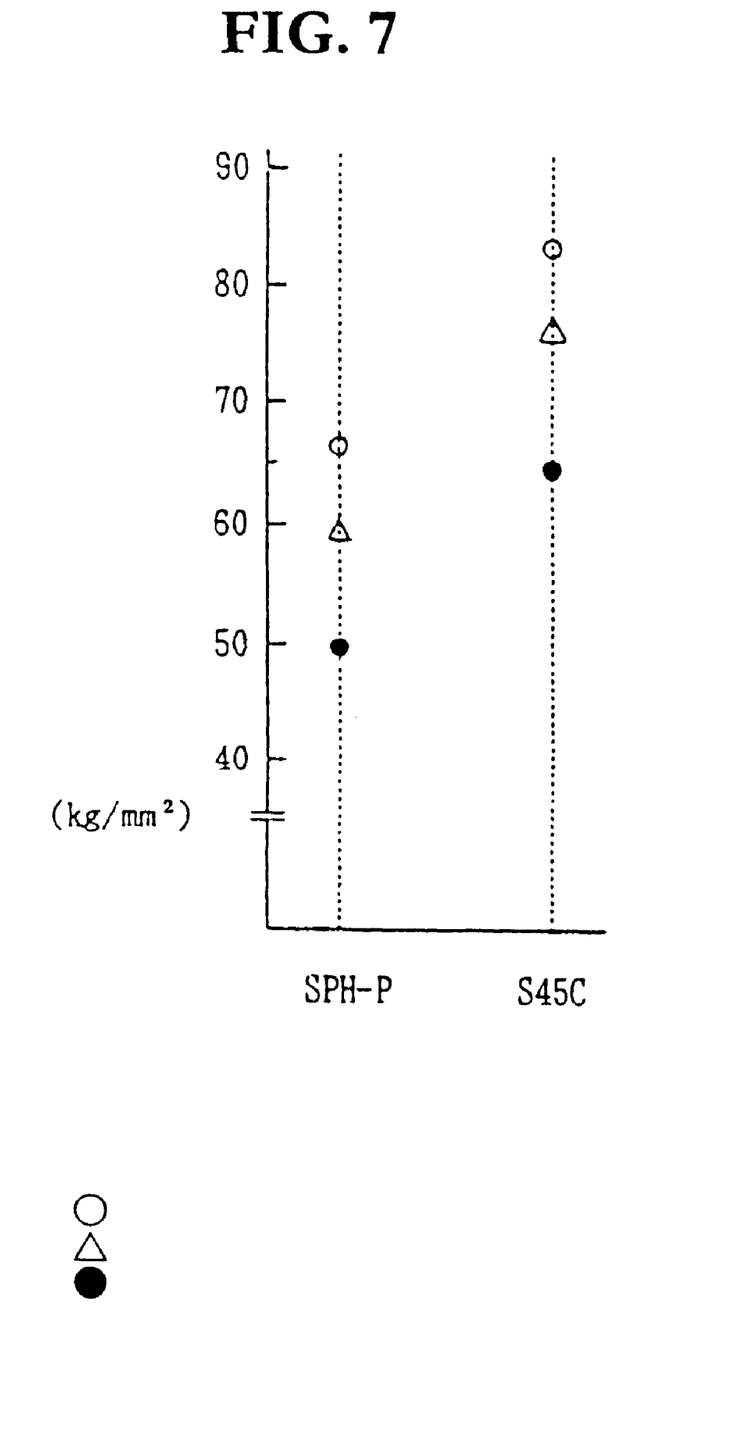
FIG. 7 is a graph showing the bending strength before and after the processing of the back metal plate for the disk brake pad mentioned above.
Figure 8:
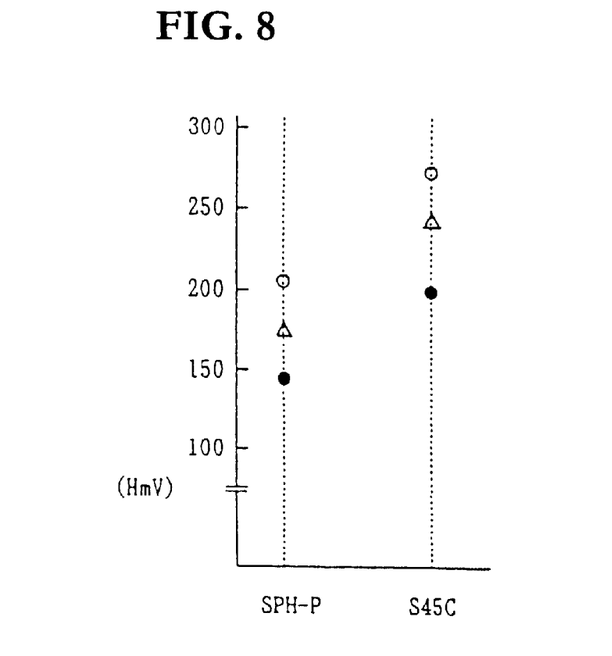
FIG. 8 is a graph showing the hardness before and after the processing of the back metal plate for the disk brake pad mentioned above.

When SPHC-P is used as the material of the back metal plate 3, the original bending strength of the material before the processing was 50 kg/mm$^2$, and the original hardness was Hv 150. However, after the processing to provide the back metal plate 3 with dimples 3a formed to opposing positions on both upper and lower surfaces and having a depth of 0.5 mm, the bending strength of the back metal plate increased to 67 kg/mm$^2$, and the hardness improved to Hv 210. The present process improved the steel plate SPHC-P to obtain the original bending strength and hardness of a carbon steel S45C that is used for mechanical structures (FIGS. 7 and 8).

Moreover, when the steel plate S45C is used as the material of the back metal plate 3, the original bending strength before the processing was 64 kg/mm$^2$, and the original hardness was Hv 195. However, when dimples 3a are formed to both sides of the back metal plate 3 in opposing positions with a depth of 0.5 mm, the bending strength became 82 kg/mm$^2$, and the hardness improved to Hv 275 (FIGS. 7 and 8).

The result of these experiments show that the bending strength of the back metal plate is improved to 0.3 times the original value, and the hardness of the back metal plate is improved to 1.4 times the original value. Moreover, in order to form a back metal plate having a desired bending strength and hardness, it would take a plate having a thickness of 6 mm without dimples, but would only take a plate having a thickness of 4.5 mm with dimples formed thereto according to the present invention, thereby enabling to reduce the weight of the back metal plate by 25 to 30%.

Figure 9:
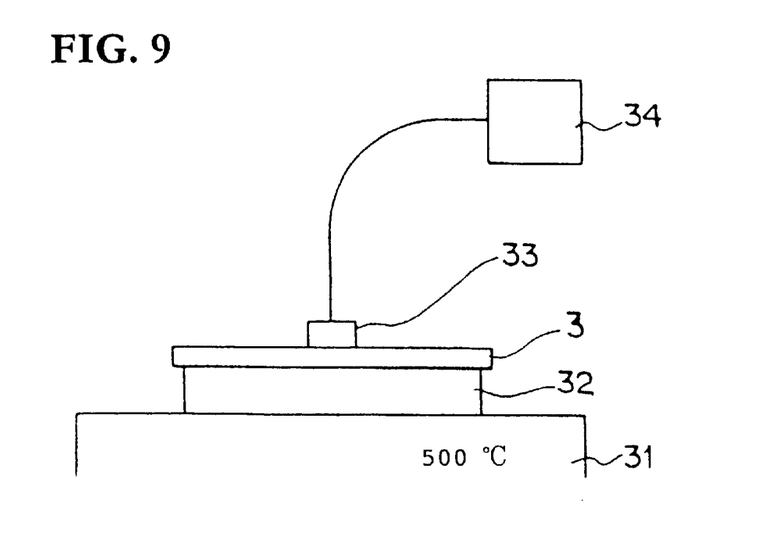
FIG. 9 is an explanatory view showing the concept of the device used for the temperature rising test of the back metal plate for the disk brake pad mentioned above.

The influence of thermal conduction to the piston 4 is measured and studied using a temperature rise sensor as shown in FIG. 9.

The temperature rise sensor comprises a platen 31 heated to 500° C., a test piece pad 32 mounted on the platen that corresponds to the friction member formed of a semimetallic pad having good thermal conductivity, and a back metal plate 3 mounted thereto, creating an arrangement similar to that of the disk brake. Then, a contact-type surface thermometer 33 is placed on the upper surface of the back metal plate 3, the measurement result of which is recorded by a recorder 34.

Figure 10:
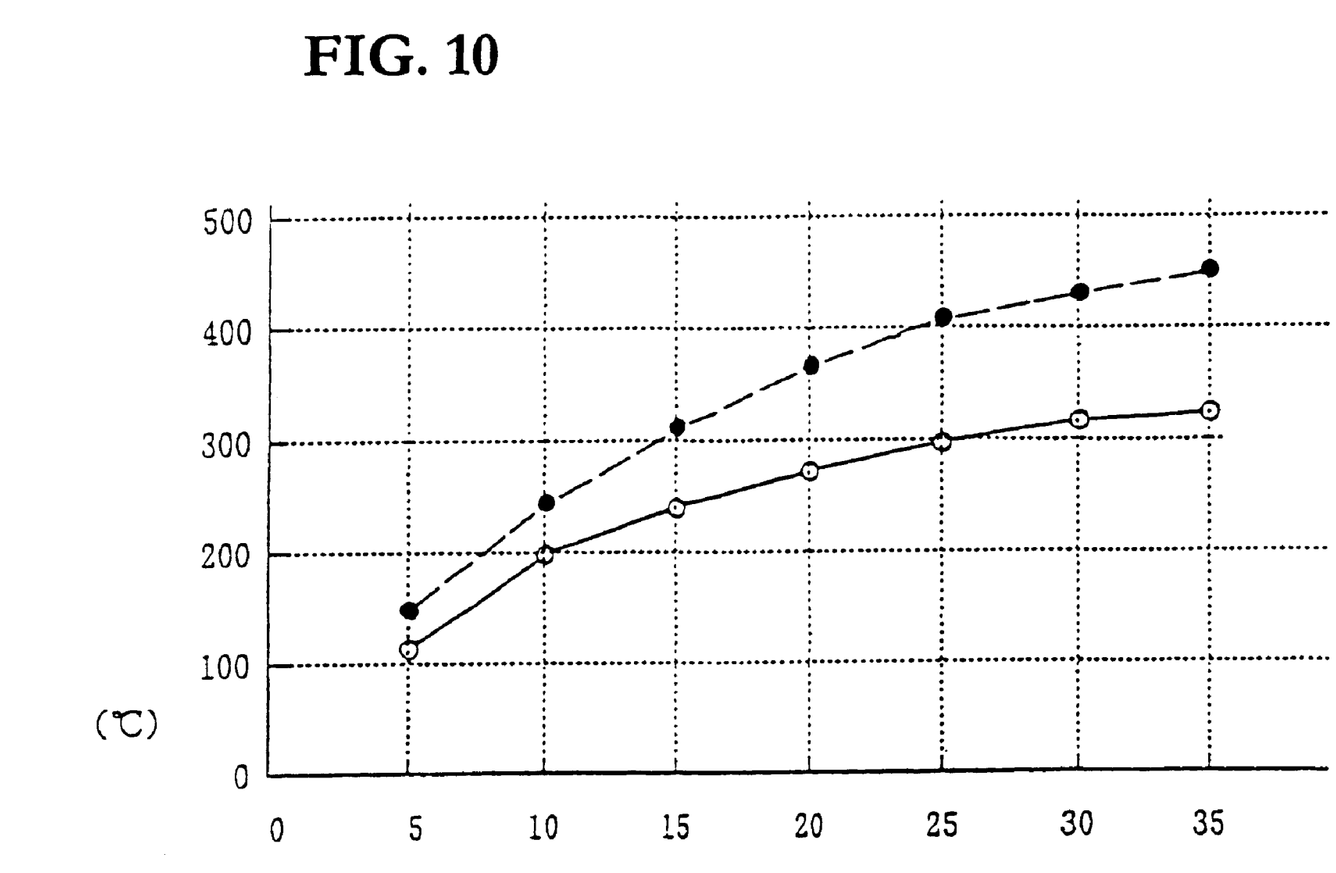
FIG. 10 is a graph showing the relation between the back metal plate temperature and the heating time of the back metal plate for the disk brake pad mentioned above.

The result of the measurement performed using the above device is shown in FIG. 10. According to the result, the temperature of the present invention is lower than that of the conventional pad.

Moreover, a full-sized brake tester is used to measure the temperature rise of the brake fluid corresponding to the number of brakes being performed by the brake item of an actual car.

Braking is repeatedly performed so as to suppress speed according to the following conditions of the test: the moment of intertia of the tester is 7.5 kgf·m·s$^2$, the initial velocity of the brake is 150 km/h, the terminal velocity of the brake is 50 km/h, and the deceleration is 4.4 m/s$^2$.

Figure 11:
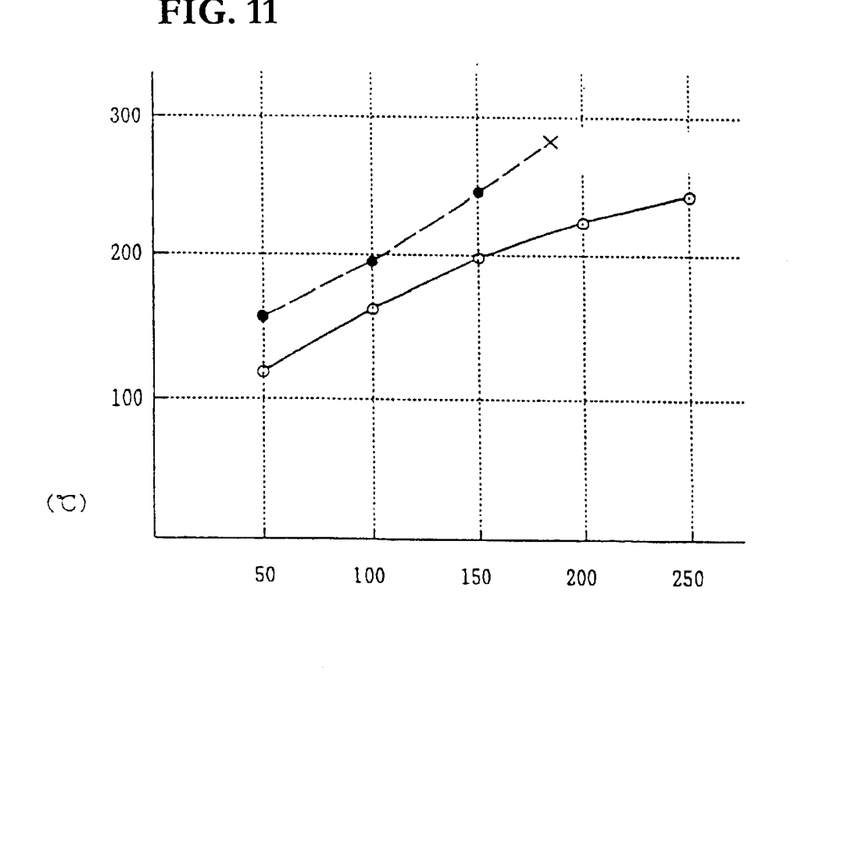
FIG. 11 is a graph showing the relation between the number of braking and the brake fluid temperature of the back metal plate for the disk brake pad mentioned above.

The result of the test is shown in FIG. 11. As shown in the result, the brake fluid temperature is lower according to the present invention than that of the prior art.

Normally, when the brake is used repeatedly, the heat generated between the friction members 2, 2 and the rotor 1 gradually heats the back metal plate 3, and through the back metal plate 3 heats the piston 4, and finally raises the temperature of the brake fluid that adds force to the piston 4. In some cases the brake liquid boils, causing a so-called vapor lock phenomenon where the brake will not work at all. However, as shown in FIG. 11, according to the present invention the brake fluid did not boil even when the number of braking being performed exceeded the number where according to the prior art brake pad the boiling of the brake fluid was observed, and the brake continued to work normally.

[Other Embodiments]

While the invention has been described by means of a specific example and in a specific embodiment, the present invention should not be limited thereto, and various modifications are possible. The following explains some other examples and embodiments that fall under the scope of the present invention.

FIRST EXAMPLE

Figure 4B:
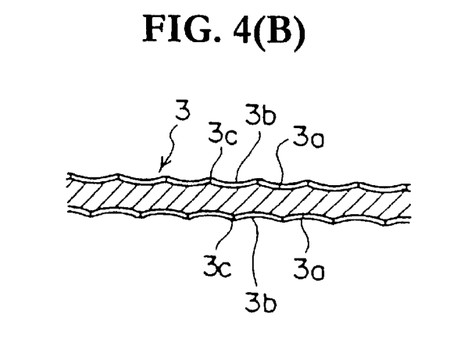

As shown in FIG. 4(B), if the pitch of the dimples 3a formed on the upper side of the back metal plate 3 is displaced from that of the dimples formed on the lower side, the bend strength and the hardness is observed to be at the intermediate value between the original bend strength and hardness and the bend strength and hardness when the dents 3a are formed on opposing positions on the upper and lower surfaces of the back metal plate, as shown in FIGS. 7 and 8.

SECOND EXAMPLE

Figure 12:
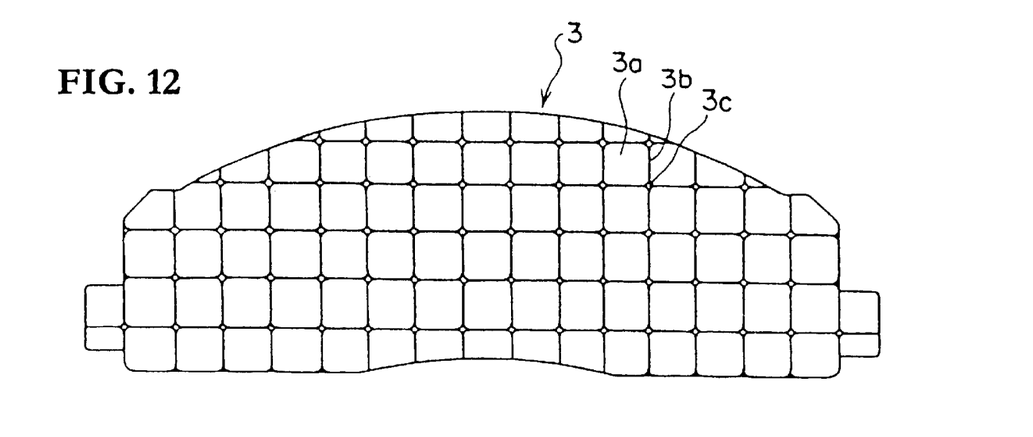
FIG. 12 is an explanatory view showing the exterior of the front surface shape of the back metal plate for the disk brake pad mentioned above with no perforation.

Normally, the back metal plate 3 comprises plural perforations 3d, but when a back metal plate 3 omitting the perforation 3d as shown in FIG. 12 is to be manufactured, many continuous dimples 3a are formed on the back metal plate 3 so as to increase the contact area between the back metal plate 3 and the friction member 2. Further, the reinforcement effect provided by the border portions 3b increase the bend strength and the shear strength etc., enabling the perforations to be omitted.

By omitting the perforation 3d, the strength of the back metal plate 3 increases, reducing the distortion that tends to occur when using the brake, improving the contact with the rotor 1, thereby stabling the effect of the brake and reducing the brake noise. Especially, by the existence of the border portions 3b and the hardening process, the bend strength of the back metal plate is improved by approximately 50% from the conventional product.

Another advantage of not forming the perforation 3d is that the occurrence of rust between the friction member 2 and the back metal plate 3 is prevented. When back metal plate 3 having perforations 3d is used, the back metal plate 3 comes into contact with moisture such as rain water when the brake is used, and the moisture enters through the perforation 3d formed between the back metal plate 3 and the porous friction member 2 into the contact portion, generating rust to the back metal made of steel, deteriorating the contact strength between the back metal plate 3 and the friction member 2, sometimes even causing separation of the two members. However, by using a back metal plate 3 having no perforation 3d, the problem mentioned above can be solved.

THIRD EXAMPLE

When a rolling process using a roller is applied for manufacturing the present back metal plate, rollers having concavity and convexity formed to the surface are used instead of the metal molds, and the rollers are pressed onto the plate material, forming predetermined concavity and convexity to the surfaces of the plate. In this example, the metallographic of the plate material being pressed by upper and lower rollers is plasticized and deformed, thereby being formed into a back metal plate 3 having predetermined dimples 3a.

FOURTH EXAMPLE

According to another example of the present invention, the shape of each dimple is not limited to a complete spherical shape, but can be of any shape as long as it has a rounded surface and plural dimples are overlapped at convexed portions, since by forming such dimples the upper end portion of the border area is convexed toward the inside of the dimples, realizing the effects of the present invention.

EFFECT OF THE INVENTION

As explained, the back metal plate for a disk brake pad according to the present invention comprises plural dimples each having a substantially spherical surface and positioned so that a portion of one dimple overlaps a portion of the adjacent dimple, said dimples being formed on at least one surface of the front or back side of a plate-like member, a flat portion at the upper end surface surrounded by the dimples that constitutes the same surface as the plate surface, and a border portion formed to the area in which the dimples overlap that is lower than the flat portion but higher than the bottom portion of the dimples, characterized in that the border portions protrude around the dimples increasing the bend strength, and relatively reducing the weight of the back metal plate. By forming a plurality of dimples, border portions and flat portions on the surface of the back metal plate thereby creating a wavelike cross-sectional shape of the back metal plate, the contact area between the back metal plate and the piston is reduced and the contact portion has gaps formed thereto, through which air flows, helping heat radiation and reducing heat transmission to the piston and preventing excessive temperature rise of the brake fluid.

Further, the back metal plate of a disk brake pad according to claim 2 characterizes in that the depth of each dent is 0.3 to 1.5 mm, improving the reinforcement effect as a result.

Moreover, the back metal plate of a disk brake pad according to claim 3 characterizes in that the dimples are formed to opposing positions on the front and back surfaces of the back metal plate, increasing the reinforcement effect of the boundary portions and thereby increasing the strength of the back metal plate.

Even further, the back metal plate of a disk brake pad according to claim 4 characterizes in that the dimples are formed so that the pitch of the dimples formed on one side is displaced from the pitch of the dimples formed on the other side of the back metal plate, thereby maintaining a substantially even thickness but still increasing the strength of the back metal plate.

According to claim 5 of the invention, the method for manufacturing the back metal plate of a disk brake pad characterizes in forming predetermined dimples by coining the plate material through cold-working, thereby hardening the steel plate surface and increasing the bending strength by the border portions formed between the plurality of dimples, improving the bend strength without increasing the plate thickness of the back metal. Moreover, the dimples formed on the whole surface of the plate creates a wavelike cross-section of the back metal plate so that only a portion of the whole surface of the back metal plate will contact the piston, limiting the contact area by the dimples, the border portions and the flat portions and creating a gap to the contact area. This feature encourages heat radiation of the back metal plate, suppresses the friction heat generated during braking from being transmitted to the piston via the back metal plate, thereby effectively suppressing the temperature of the brake fluid from rising excessively.

Further, the method for manufacturing the back metal plate of a disk brake pad according to claim 6 applies a rolling process, wherein the metallographic of the plate material being pressed by rollers is plasticized and deformed, being formed into a back metal having predetermined sized dimples.

We claim:

1. A back metal plate of a disk brake pad comprising:

a plurality of dimples each having a substantially spherical surface with a portion being overlapped to one portion of another dimple, said dimples formed to at least either a front surface or a back surface of said back metal plate, thereby forming a plate surface;

flat portions surrounded by said dimples, the upper surface of which constituting the same surface as said plate surface; and boundary portions formed to the areas where said dimples overlap, which are lower than said flat portions but higher than the bottom portion of said dimples.

2. A back metal plate of a disk brake pad according to claim 1, wherein the depth of said dimples is in the range of 0.3 to 1.5 mm.

3. A back metal plate of a disk brake pad according to claim 1, wherein said dimples are formed to both front and back surfaces of said back metal, the dimples on one side being positioned so as to oppose to the dimples on the other side.

4. A back metal plate of a disk brake pad according to claim 1, wherein said dimples are formed to both front and back surfaces of said back metal, the pitch of the dimples formed on one side being displaced from the pitch of the dimples on the other side.

5. A method for manufacturing a back metal plate of a disk brake pad, wherein the dimples according to claim 1 are formed by cold-working a plate material through coining.

6. A method for manufacturing a back metal plate of a disk brake pad, wherein the dimples according to claim 1 are formed by a rolling process.

* * * * *